(12) United States Patent
Lee et al.

(10) Patent No.: US 10,917,448 B2
(45) Date of Patent: Feb. 9, 2021

(54) METHOD AND APPARATUS FOR BROADCAST GATEWAY SIGNALING FOR ENSURING RELIABILITY

(71) Applicants: ELECTRONICS AND TELECOMMUNICATIONS RESEARCH INSTITUTE, Daejeon (KR); CLEVERLOGIC CO., LTD., Daejeon (KR)

(72) Inventors: Jae-Young Lee, Daejeon (KR); Young-Min Choi, Daejeon (KR); Soon-Choul Kim, Daejeon (KR); Sung-Ik Park, Daejeon (KR); Heung-Mook Kim, Daejeon (KR)

(73) Assignees: Electronics and Telecommunications Research Institute, Daejeon (KR); Cleverlogic Co., Ltd., Daejeon (KR)

( * ) Notice: Subject to any disclaimer, the term of this patent is extended or adjusted under 35 U.S.C. 154(b) by 0 days.

(21) Appl. No.: 16/444,095

(22) Filed: Jun. 18, 2019

(65) Prior Publication Data
US 2019/0387035 A1   Dec. 19, 2019

(30) Foreign Application Priority Data

Jun. 18, 2018 (KR) .................. 10-2018-0069888
Jun. 19, 2018 (KR) .................. 10-2018-0070455
May 24, 2019 (KR) .................. 10-2019-0061465

(51) Int. Cl.
*H04L 29/06*   (2006.01)
*H04L 12/741*  (2013.01)
*H04L 12/46*   (2006.01)

(52) U.S. Cl.
CPC ...... *H04L 65/4076* (2013.01); *H04L 12/4633* (2013.01); *H04L 45/74* (2013.01); *H04L 65/608* (2013.01); *H04L 69/169* (2013.01)

(58) Field of Classification Search
CPC . H04L 65/4076; H04L 12/4633; H04L 45/74; H04L 65/608; H04L 69/169
USPC ........................................ 370/351, 389, 392
See application file for complete search history.

(56) References Cited

U.S. PATENT DOCUMENTS

| 2004/0148642 | A1* | 7/2004 | Park | H04N 7/16 |
| | | | | 725/148 |
| 2009/0207861 | A1* | 8/2009 | Iannuzzelli | H04H 20/30 |
| | | | | 370/476 |
| 2019/0313137 | A1* | 10/2019 | Bui Do | H04L 65/1069 |

OTHER PUBLICATIONS

"ATSC Standard: Scheduler/Studio to Transmitter Link", *Advanced Television Systems Committee*, Doc. A/324:2018, Jan. 5, 2018, pp. 1-83 (83 pages in English).

* cited by examiner

*Primary Examiner* — Obaidul Huq
(74) *Attorney, Agent, or Firm* — NSIP Law (57) ABSTRACT

Disclosed herein are a method for broadcast gateway signaling and an apparatus for the same. The apparatus for broadcast gateway signaling includes an inner packet generator for generating an inner packet corresponding to the inner layer of a tunneling system; an outer packet generator for generating an outer packet corresponding to the outer layer of the tunneling system; an outer packet header generator for generating the header of the outer packet; and an STL transmission unit for transmitting the outer packet to a transmitter via a Studio-to-Transmitter Link (STL).

17 Claims, 8 Drawing Sheets

METHOD AND APPARATUS FOR BROADCAST GATEWAY SIGNALING FOR ENSURING RELIABILITY

CROSS REFERENCE TO RELATED APPLICATIONS

This application claims the benefit of Korean Patent Application No. 10-2018-0069888, filed Jun. 18, 2018, No. 10-2018-0070455, filed Jun. 19, 2018, and No. 10-2019-0061465, filed May 24, 2019, which are hereby incorporated by reference in their entireties into this application.

BACKGROUND OF THE INVENTION

1. Technical Field

The present invention relates generally to technology for transmitting broadcast signals, and more particularly to a broadcast signal transmitter for transmitting broadcast signals and a broadcast gateway apparatus for providing broadcast data to the broadcast signal transmitter.

2. Description of the Related Art

In terrestrial broadcasting, a Single-Frequency Network (SFN) has emerged as an alternative to conventional Multiple-Frequency Network (MFN) modes. An SFN is configured such that multiple transmitters simultaneously transmit signals on the same RF channel.

For a broadcast service, multiple transmitters are provided with broadcast data from a broadcast gateway apparatus, generate broadcast signals for a broadcast service using the broadcast data, and transmit the broadcast signals to receivers.

Various broadcast signal transmission/reception techniques have been developed in order to transmit and receive broadcast signals between a transmitter and a receiver, but there has been little focus on the development of signal transmission/reception technology on a transmission-system side.

Particularly, new data transmission technology, which is capable of efficiently transmitting broadcast data from a broadcast gateway apparatus to a transmitter while guaranteeing reliability regardless of the state or type of network that is used, and broadcast gateway signaling technology therefor are required.

SUMMARY OF THE INVENTION

An object of the present invention is to efficiently transmit broadcast data from a broadcast gateway apparatus to a transmitter while ensuring reliability regardless of the state or type of network that is used.

Another object of the present invention is to provide a broadcast-gateway-signaling method capable of ensuring reliability even when a public network is used between a broadcast gateway apparatus and a transmitter.

A further object of the present invention is to optimize a broadcast-gateway-signaling field that is used in order to ensure reliability when a public network is used between a broadcast gateway apparatus and a transmitter.

In order to accomplish the above objects, a broadcast gateway apparatus according to the present invention includes an inner packet generator for generating an inner packet corresponding to the inner layer of a tunneling system; an outer packet generator for generating an outer packet corresponding to the outer layer of the tunneling system using the inner packet; an outer packet header generator for generating the header of the outer packet; and an STL transmission unit for transmitting the outer packet to a transmitter via a Studio-to-Transmitter Link (STL).

Here, the inner packet may be encapsulated through the outer packet.

Here, the tunneling system may be configured such that a group of parallel and independent packet streams corresponding to the inner packet are carried within a single packet stream corresponding to the outer packet.

Here, the outer packet may be transmitted through an RTP/UDP/IP unicast protocol stack.

Here, the header may include a redundancy field that indicates the number of redundant copies of the outer packet.

Here, the redundancy field may be a two-bit field, may be set to '0' in order to indicate that there are no redundant copies of the outer packet, and may be set to an integer that is greater than '0' and less than '4' in order to indicate that there are redundant copies of the outer packet.

Here, when the redundancy field is set to an integer that is greater than '0' and less than '4', the redundancy field may indicate the number of redundant streams.

Here, the header may include a sequence number field that is increased by one for each packet of an outer packet RTP stream.

Here, when the redundancy field is set to an integer that is greater than '0' and less than '4', the STL transmission unit may transmit redundant copies of the outer packet having the same sequence number field, in accordance with the redundancy field.

Also, an apparatus for transmitting a broadcast signal according to an embodiment of the present invention includes a packet reception unit for receiving signals corresponding to outer packets, which are transmitted via a Studio-to-Transmitter Link (STL); an outer-packet-processing unit for processing a protocol, thereby restoring the outer packets; a redundancy-processing unit for performing redundancy processing for multiple outer packets, corresponding to redundant copies, using a redundancy field included in the header of each of the outer packets, thereby generating an outer packet, the redundancy of which is processed; and a physical-layer-processing unit for performing physical-layer processing using the outer packet, the redundancy of which is processed, thereby generating a broadcast signal to be transmitted.

Here, the header may include a sequence number field that is increased by one for each packet of an outer packet RTP stream, and the multiple outer packets corresponding to the redundant copies may be identified using the sequence number field.

Here, the apparatus may further include an error-correction-processing unit for performing error-correction processing for the restored outer packets.

Here, each of the outer packets may include at least one inner packet in the payload thereof and correspond to the outer layer of a tunneling system, and the inner packet may correspond to the inner layer of the tunneling system.

Here, the outer packets may be transmitted through an RTP/UDP/IP unicast protocol stack.

Here, the redundancy field may indicate the number of redundant copies of the outer packet.

Here, the redundancy field may be a two-bit field, may be set to '0' in order to indicate that there are no redundant copies of the outer packet, and may be set to an integer that is greater than '0' and less than '4' in order to indicate that there are redundant copies of the outer packet.

Here, when the redundancy field is set to an integer that is greater than '0' and less than '4', the redundancy field may indicate the number of redundant streams.

Also, a broadcast-gateway-signaling method according to an embodiment of the present invention includes generating an inner packet corresponding to the inner layer of a tunneling system; generating an outer packet corresponding to the outer layer of the tunneling system using the inner packet; and transmitting the outer packet to a transmitter via a Studio-to-Transmitter Link (STL). The outer packet may include a header, which includes a redundancy field that indicates the number of redundant copies.

Here, the redundancy field may be a two-bit field, may be set to '0' in order to indicate that there are no redundant copies of the outer packet, and may be set to an integer that is greater than '0' and less than '4' in order to indicate that there are redundant copies of the outer packet.

Here, when the redundancy field is set to an integer that is greater than '0' and less than '4', the redundancy field may indicate the number of redundant streams.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Figure 1:
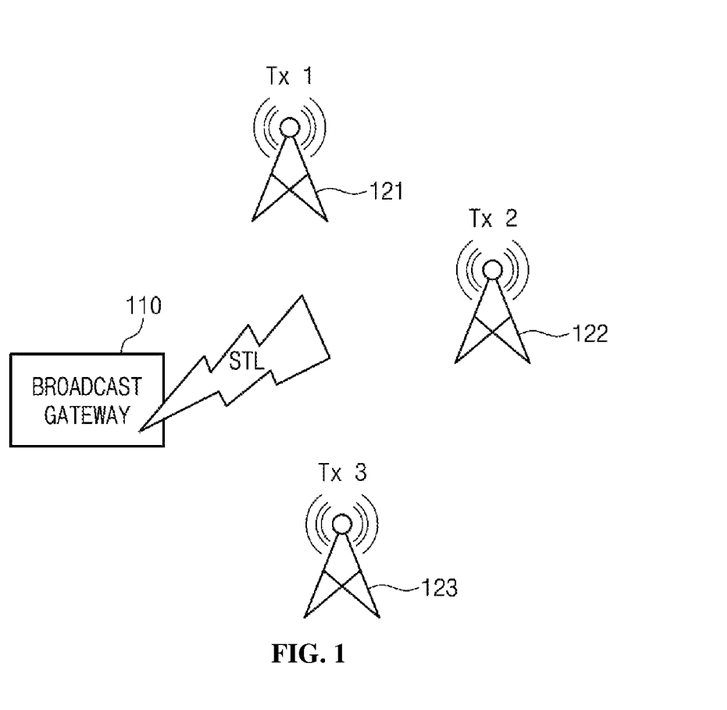
FIG. 1 is a block diagram that shows a broadcast signal transmission system according to an embodiment of the present invention.

FIG. 1 is a block diagram that shows a broadcast signal transmission system according to an embodiment of the present invention.

Referring to FIG. 1, a broadcast signal transmission system according to an embodiment of the present invention includes a broadcast gateway apparatus 110 and multiple transmitters 121, 122 and 123.

The broadcast gateway apparatus 110 transmits a broadcast packet for a broadcast service to one or more of the multiple transmitters 121, 122 and 123. Here, the broadcast packet may be transmitted via a Studio-to-Transmitter Link (STL). Here, the broadcast packet may be a packet based on a Studio-to-Transmitter Link Transport (tunneling) Protocol (STLTP).

The Studio-to-Transmitter Link (STL) may be a data transmission/reception link between the broadcast gateway apparatus 110 and the transmitters 121, 122 and 123 in the broadcast transmission system, and may be a fiber, satellite, or microwave link. Here, the STL may be a wired or wireless link, and may be a link through which data is transmitted and received using a packet-based protocol, such as RTP/UDP/IP or the like.

The transmitters 121, 122 and 123 generate broadcast signals to be provided to receivers using the broadcast packets transmitted from the broadcast gateway apparatus 110 and transmit the generated broadcast signals to the receivers over a broadcast network. Here, the transmitters 121, 122 and 123 may be high-power transmitters, or may be low-power transmitters, such as gap fillers or the like.

Here, when the multiple transmitters 121, 122 and 123 are high-power transmitters, broadcast companies may use a dedicated network for a reliable STL. Here, when the multiple transmitters 121, 122 and 123 are low-power transmitters for coverage extension, broadcast companies may use a public network for the transmission of broadcast packets, rather than using a dedicated network.

Here, when the STL between the broadcast gateway apparatus 110 and the multiple transmitters 121, 122 and 123 is based on a public network, there is an advantage in that costs may be reduced compared to the case in which a dedicated network is used, but reliability may be reduced.

Accordingly, what is required a method for guaranteeing reliability when the STL between the broadcast gateway apparatus 110 and the multiple transmitters 121, 122 and 123 uses a public network.

For example, when a public network is used, redundancy may be provided by transmitting a plurality of identical broadcast packets, or an Error Correction Code (ECC) may be applied to broadcast packets.

For example, when the transmitter 121 is a main high-power transmitter, a dedicated network may be used in order to transmit a broadcast packet from the broadcast gateway apparatus 110 to the transmitter 121. Here, the broadcast packet may be a multicast IP packet.

For example, when the transmitter 122 is a less important low-power transmitter or gap filler, a public network may be used in order to transmit a broadcast packet from the broadcast gateway apparatus 110 to the transmitter 122. Here, the broadcast packet may be a unicast IP packet.

Here, in the case of transmission of a unicast IP packet over a public network, in order to improve reliability, redundancy may be provided, and an error correction code (ECC) may be applied.

Here, the broadcast packet may correspond to an outer packet. That is, first, an inner packet may be generated by encapsulating a baseband packet, a preamble, and a timing and management packet, and an outer packet may be generated using the inner packet. Here, the outer packet may be the broadcast packet.

That is, the inner packet may be tunneled by the outer packet, the outer packet may be a tunneling packet, and the inner packet may be a tunneled packet.

Here, the inner packet includes a baseband packet, a preamble packet, and a timing and management packet, and may correspond to the inner layer of a tunneling system. Here, the outer packet may correspond to the outer layer of the tunneling system. Here, the inner packet may be encapsulated through the outer packet.

Here, the tunneling system may correspond to a process by which a group of parallel and independent packet streams corresponding to the inner packet are carried within a single packet stream corresponding to the outer packet.

Figure 2:
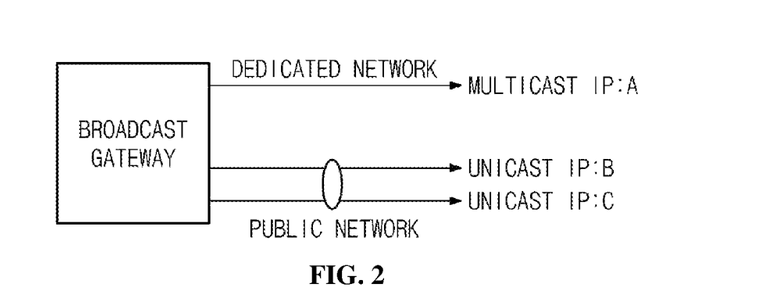
FIG. 2 is a block diagram that shows an example of a broadcast gateway apparatus that transmits a broadcast packet using both multicast and unicast according to an embodiment of the present invention.

FIG. 2 is a block diagram that shows an example of a broadcast gateway apparatus for transmitting broadcast packets using both multicast and unicast according to an embodiment of the present invention.

Referring to FIG. 2, the broadcast gateway apparatus may primarily use multicast in order to transmit broadcast packets. Here, the broadcast gateway apparatus may transmit the broadcast packets using a reliable dedicated network. Here, the transmitters that receive the broadcast packets may be main high-power transmitters.

Also, the broadcast gateway apparatus may optionally use unicast in order to transmit broadcast packets. Here, the broadcast gateway apparatus may transmit the broadcast packets via a public network. Here, the transmitters that receive the broadcast packets may be low-power transmitters or gap fillers.

Here, the broadcast gateway apparatus may provide redundant packets, whereby a reliability reduction, which may be caused due to the use of a public network for the transmission of broadcast packets, may be prevented. Here, an error correction code (ECC) is used along with redundancy, whereby reliability may be further improved.

Figure 3:
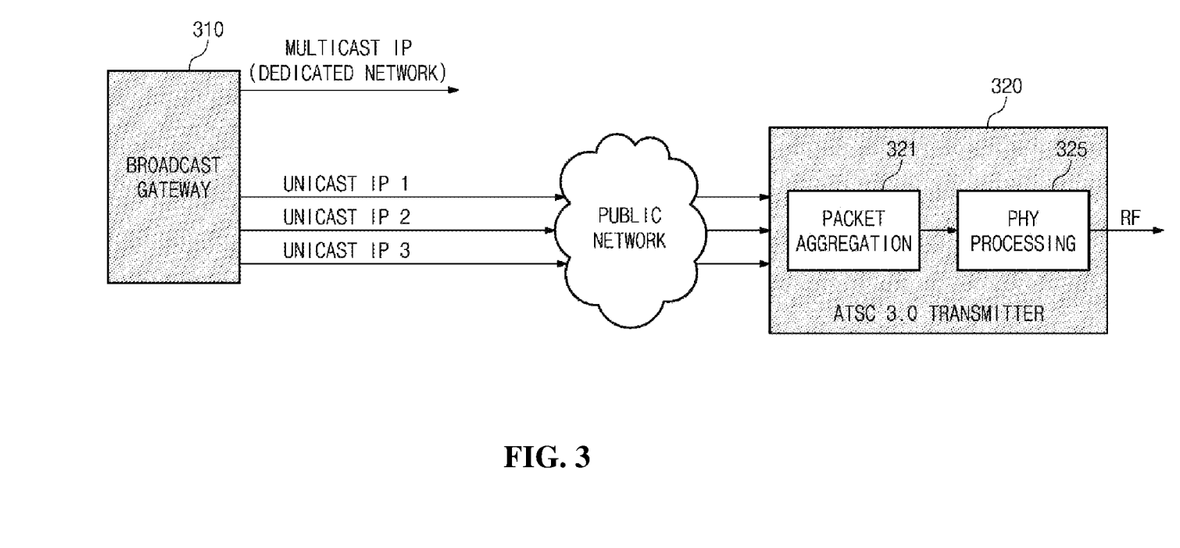
FIG. 3 is a block diagram that shows an example of a broadcast signal transmission system that transmits a broadcast packet using both multicast and unicast according to an embodiment of the present invention.

FIG. 3 is a block diagram that shows an example of a broadcast signal transmission system that transmits broadcast packets using both multicast and unicast according to an embodiment of the present invention.

Referring to FIG. 3, the broadcast signal transmission system includes a broadcast gateway apparatus 310 and a transmitter 320.

The broadcast gateway apparatus 310 may transmit broadcast packets using multicast and unicast. Particularly, when a broadcast packet is transmitted using unicast, the broadcast packet may be transmitted via a public network, in which case the broadcast gateway apparatus 310 may provide redundant broadcast packets in order to improve reliability.

As described above, the broadcast packet may correspond to an outer packet (tunneling packet). Here, the outer packet may be transmitted through an RTP/UDP/IP multicast protocol stack, which uses a dedicated network for reliable packet delivery.

When it is difficult to use multicast for a Studio-to-Transmitter Link (STL) because a public network is used rather than a dedicated network, the outer packet (tunneling packet) may be transmitted through an RTP/UDP/IP unicast protocol stack. Because the public network may not be reliable, packets may be dropped over the STL, and redundant streams of outer packets (tunneling packets) may be employed in order to prevent such packet drop. Here, when the redundant streams of outer packets are employed, the broadcast gateway apparatus 310 may enable a redundancy field included in the header of the outer packet.

The transmitter 320 may include a packet aggregator 321 and a physical-layer-processing unit 325.

In the transmitter 320, the redundant outer packets (tunneling packets) may be aggregated before the process of a physical layer chain is performed. Here, the physical layer chain may include BICM, framing, interleaving, and waveform generation.

That is, the packet aggregator 321 performs redundancy processing by gathering redundant packets.

The physical-layer-processing unit 325 generates a broadcast signal using the outer packet, the redundancy of which is processed. Here, the physical-layer-processing unit may include a BICM unit, a framing and interleaving unit, and a waveform generation unit.

Here, the transmitter 320 may use a sequence number field included in the header of a received outer packet in order to determine which packets are received or lost over the respective multiple unicast paths. Here, the sequence number field may be set identically for the respective RTP/UDP/IP unicast streams.

Figure 4:
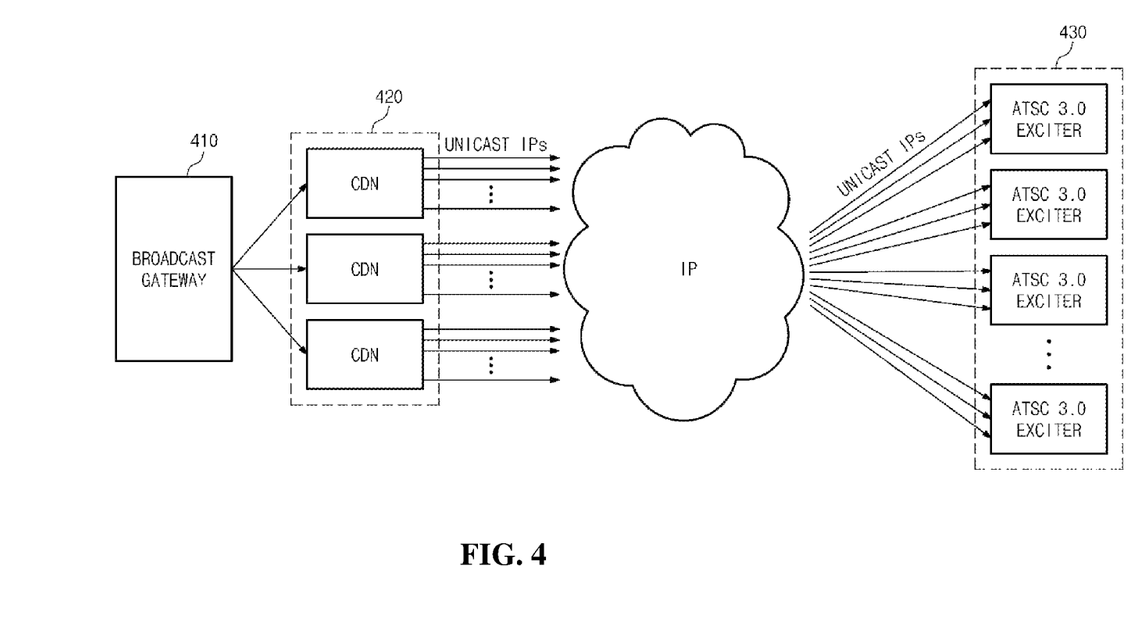
FIG. 4 is a block diagram that shows another example of a broadcast signal transmission system according to an embodiment of the present invention.

FIG. 4 is a block diagram that shows another example of a broadcast signal transmission system according to an embodiment of the present invention.

Referring to FIG. 4, the broadcast signal transmission system according to an embodiment of the present invention includes a broadcast gateway apparatus 410, transmission servers 420, and transmitters 430.

The multiple transmitters 430 may be connected with the broadcast gateway apparatus 410 via the transmission servers 420 using unicast.

The broadcast gateway apparatus 410 transmits outer packets, which are to be provided to the multiple transmitters, to the multiple transmission servers 420, and the transmission servers 420 may transmit the received outer packets to the multiple transmitters 430.

Here, each of the transmission servers 420 may correspond to a content delivery network (CDN).

Here, an error correction code (ECC) may be used along with redundancy in order to improve reliability.

The broadcast signal transmission system illustrated in FIG. 4 is configured such that the transmission servers 420 function to transmit outer packets to be provided to the multiple transmitters 430, thereby reducing the load on the broadcast gateway apparatus 410. For example, each of the transmitters 430 may receive three redundant packets for reliability.

Figure 5:
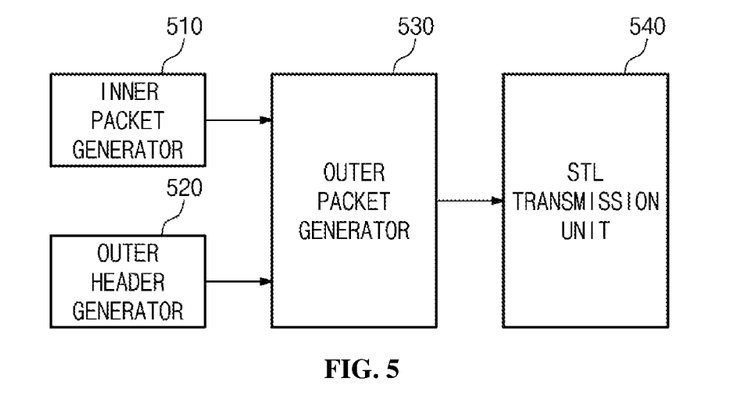
FIG. 5 is a block diagram that shows an example of the broadcast gateway apparatus illustrated in FIG. 1.

FIG. 5 is a block diagram that shows an example of the broadcast gateway apparatus illustrated in FIG. 1.

Referring to FIG. 5, the broadcast gateway apparatus illustrated in FIG. 1 includes an inner packet generator 510, an outer packet header generator 520, an outer packet generator 530, and an STL transmission unit 540.

The inner packet generator 510 generates an inner packet corresponding to the inner layer of a tunneling system by including a baseband packet, a preamble, and a timing and management packet in the inner packet.

The outer packet generator 530 generates an outer packet, corresponding to the outer layer of the tunneling system, using the inner packet.

The outer packet header generator 520 generates the header of the outer packet.

The STL transmission unit 540 transmits the outer packet to a transmitter via a Studio-to-Transmitter Link (STL).

Here, the inner packet may be encapsulated in the outer packet.

Here, the tunneling system may be configured such that a group of parallel and independent packet streams corresponding to the inner packet are carried within a single packet stream corresponding to the outer packet.

Here, the outer packet may be transmitted through an RTP/UDP/IP unicast protocol stack.

Here, the header may include a redundancy field, which indicates the number of redundant copies of the outer packet.

Here, the redundancy field is a two-bit field, and may be set to '0' in order to represent that there are no redundant copies of of the outer packet, and may be set to an integer that is greater than '0' and less than '4' in order to represent that there are redundant copies of the outer packet.

Here, when the redundancy field is set to an integer that is greater than '0' and less than '4', the redundancy field may indicate the number of redundant streams.

Here, the header may include a sequence number field, which is increased by one for each packet of an RTP stream.

Here, when the redundancy field is set to an integer that is greater than '0' and less than '4', the STL transmission unit 540 may transmit redundant copies of the outer packet having the same sequence number field, in accordance with the redundancy field.

The following Table 1 shows an example of the header of an outer packet (a broadcast packet, a tunneling packet).

TABLE 1

| Syntax | No. of Bits | Format |
|---|---|---|
| RTP_Fixed_Header( ) { | | |
|   version (V) | 2 | '10' |
|   padding (P) | 1 | bslbf |
|   extension (X) | 1 | '0' |
|   CSRC_count (CC) | 4 | '0000' |
|   marker (M) | 1 | bslbf |
|   payload_type (PT) | 7 | '1100001' |
|   sequence_number | 16 | uimsbf |
|   timestamp | 32 | |
|   protocol_version | 2 | uimsbf |
|   redundancy | 2 | uimsbf |
|   number_of_channels | 2 | uimsbf |
|   reserved | 10 | for (i=0; i<10; i++) '0' |
|   packet_offset | 16 | uimsbf |
| } | | |

In Table 1, 'uimsbf' means unsigned integer, most significant bit first, and 'bslbf' means bit stream, leftmost bit first. In the example of Table 1, the header of an outer packet may correspond to RTP_Fixed_Header( ), the sequence number field may correspond to sequence_number, and the redundancy field may correspond to redundancy.

Here, the header of an outer packet in Table 1 may be a kind of RTP header.

Here, sequence_number may be used when a transmitter receiving outer packets identifies redundant packets, and may be increased by one for each packet of an RTP stream.

Here, redundancy may indicate the number of redundant streams of outer packets transmitted to the Studio-to-Transmitter Link.

Here, redundancy is a two-bit field, and may be set to any one of '0', '1', '2' and '3'. For example, when redundancy is set to '0', this may indicate that there are no redundant copies of the outer packet. When redundancy is set to '3', this may indicate that the number of redundant copies of the outer packet is 3 (that is, a total of four identical packets are transmitted).

Although not included in the example of Table 1, the header may include a redundancy number field. Here, the redundancy number field may indicate the redundancy number of a corresponding outer packet, and may be meaningful only when the value of the redundancy field is not '0'. For example, when the redundancy field is set to '3', the redundancy number fields of four identical outer packets may be set to '0', '1', '2' and '3'. Here, when the redundancy number field is '0', this indicates that the corresponding packet is an original outer packet. When the redundancy number field is '1', this indicates that the corresponding packet is the first copy of the outer packet. When the redundancy number field is '2', this indicates that the corresponding packet is the second copy of the outer packet. When the redundancy number field is '3', this indicates that the corresponding packet is the third copy of the outer packet.

Although not included in the example of Table 1, the header may include a redundancy offset field. Here, the redundancy offset field may indicate the offset value of a redundant outer packet in units of milliseconds. Here, when the redundancy number field is set to '0', the redundancy offset field is set to '0', but when the redundancy number field is not '0', the redundancy offset field may be set to a value indicating the time offset of the corresponding redundant packet. For example, the redundancy offset field may be a four-bit field, and the maximum value thereof may be set to 15 milliseconds.

Figure 6:
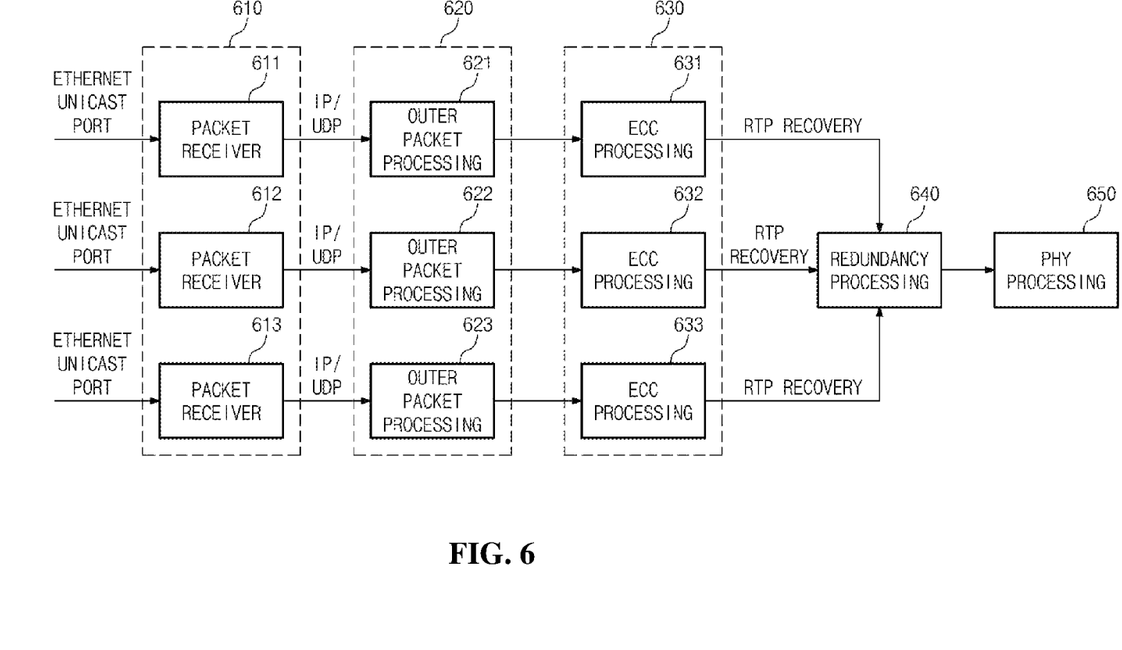
FIG. 6 is a block diagram that shows an example of the transmitter illustrated in FIG. 1.

FIG. 6 is a block diagram that shows an example of the transmitter illustrated in FIG. 1.

Referring to FIG. 6, the transmitter includes a packet reception unit 610, an outer-packet-processing unit 620, an error-correction-processing unit 630, a redundancy-processing unit 640, and a physical-layer-processing unit 650.

The packet reception unit 610 receives signals corresponding to outer packets, which are transmitted via a Studio-to-Transmitter Link (STL).

Here, each of the outer packets may include one or more inner packets in the payload thereof. Here, the inner packets may be regarded as being encapsulated through the outer packet. Here, the outer packets may be tunneling packets corresponding to the outer layer of a tunneling system, and the inner packets may be tunneled packets corresponding to the inner layer of the tunneling system.

Here, the outer packets may be transmitted through an RTP/UDP/IP unicast protocol stack.

The outer-packet-processing unit 620 restores the outer packets through protocol processing.

The error-correction-processing unit 630 performs error-correction processing for the restored outer packets.

The redundancy-processing unit 640 performs redundancy processing for multiple outer packets, corresponding to redundant copies, using a redundancy field included in the header of each of the outer packets, thereby generating an outer packet, the redundancy of which is processed. For example, the redundancy-processing unit 640 may correct an error in the received packet or the sequence of the received packet using the redundantly provided packets.

Here, the redundancy field may indicate the number of redundant copies of the outer packet.

Here, the redundancy field is a two-bit field, and may be set to '0' when there are no redundant copies of the outer packet, but may be set to an integer that is greater than '0' and less than '4' when there are redundant copies of the outer packet.

Here, when the redundancy field is set to an integer that is greater than '0' and less than '4', the redundancy field may indicate the number of redundant streams. For example, when the redundancy field is set to '3', a total of four identical outer packets may be transmitted.

The physical-layer-processing unit 650 generates a broadcast signal by performing physical-layer processing using the outer packet, the redundancy of which is processed.

For example, when the redundancy field included in the header is '2', this indicates that three identical unicast streams are transmitted from the broadcast gateway apparatus. In this case, the packet reception unit 610 may include three packet receivers 611, 612 and 613, the outer-packet-processing unit 620 may include three packet processors 621, 622 and 623, and the error-correction-processing unit 630 may include three error correction processors 631, 632 and 633.

Here, the header may include a sequence number field, which is increased by one for each packet of an RTP stream, and the multiple outer packets corresponding to redundant copies may be identified using the sequence number field.

Figure 7:
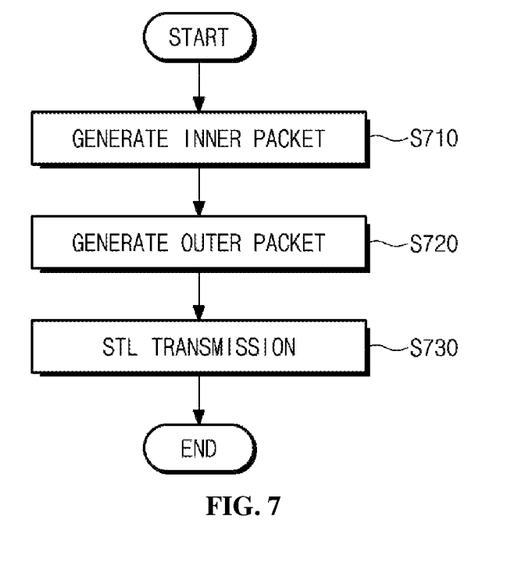
FIG. 7 is a flowchart that shows an example of a broadcast-gateway-signaling method according to an embodiment of the present invention.

FIG. 7 is a flowchart that shows an example of a broadcast-gateway-signaling method according to an embodiment of the present invention.

Referring to FIG. 7, in the broadcast-gateway-signaling method according to an embodiment of the present invention, an inner packet, corresponding to the inner layer of a tunneling system, is generated at step S710 by encapsulating a baseband packet, a preamble, and a timing and management packet.

Also, in the broadcast-gateway-signaling method according to an embodiment of the present invention, an outer packet, corresponding to the outer layer of the tunneling system, is generated at step S720 using the inner packet.

Here, the outer packet includes a header, which includes a redundancy field indicative of the number of redundant copies.

Here, the redundancy field is a two-bit field, and may be set to '0' when there are no redundant copies of the outer packet, but may be set to an integer that is greater than '0' and less than '4' when there are redundant copies of the outer packet.

Here, when the redundancy field is set to an integer that is greater than '0' and less than '4', the redundancy field may indicate the number of redundant streams.

Also, in the broadcast-gateway-signaling method according to an embodiment of the present invention, the outer packet is transmitted to a transmitter via a Studio-to-Transmitter Link (STL) at step S730.

Figure 8:
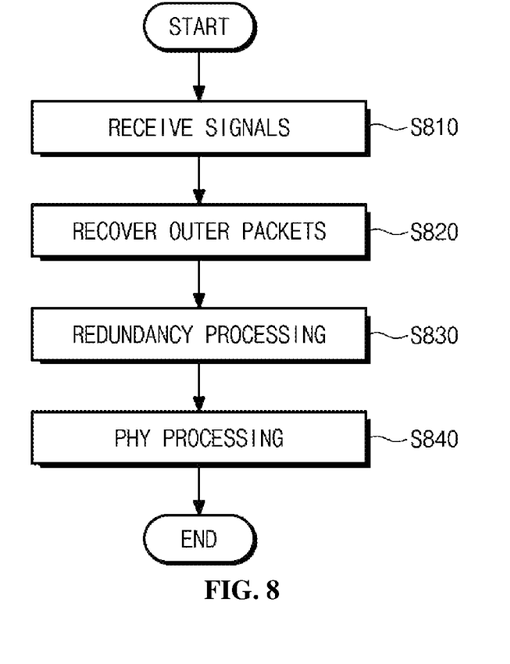
FIG. 8 is a flowchart that shows an example of a broadcast signal transmission method according to an embodiment of the present invention.

FIG. 8 is a flowchart that shows an example of a broadcast signal transmission method according to an embodiment of the present invention.

Referring to FIG. 8, in the broadcast signal transmission method according to an embodiment of the present invention, signals corresponding to outer packets, which are transmitted via a Studio-to-Transmitter Link (STL), are received at step S810.

Here, each of the outer packets may include one or more inner packets in the payload thereof. Here, the outer packets may correspond to the outer layer of a tunneling system, and the inner packets may correspond to the inner layer of the tunneling system.

Here, the outer packets may be transmitted through an RTP/UDP/IP unicast protocol stack.

Also, in the broadcast signal transmission method according to an embodiment of the present invention, the outer packets are restored at step S820 by performing protocol processing.

Also, in the broadcast signal transmission method according to an embodiment of the present invention, redundancy processing is performed for the multiple outer packets, corresponding to redundant copies, using a redundancy field included in each of the outer packets, whereby an outer packet, the redundancy of which is processed, may be generated at step S830.

Here, the redundancy field may indicate the number of redundant copies of the outer packet. Here, the redundancy field is a two-bit field, and may be set to '0' when there are no redundant copies of the outer packet, but may be set to an integer that is greater than '0' and less than '4' when there are redundant copies of the outer packet. Here, when the redundancy field is set to an integer that is greater than '0' and less than '4', the redundancy field may indicate the number of redundant streams.

Here, the header includes a sequence number field, which is increased by one for each packet of an RTP stream, and the multiple outer packets corresponding to redundant copies may be identified using the sequence number field.

Also, in the broadcast signal transmission method according to an embodiment of the present invention, a broadcast signal may be generated at step S840 by performing physical-layer processing using the outer packet, the redundancy of which is processed.

Also, although not illustrated in FIG. 8, the broadcast signal transmission method according to an embodiment of the present invention may further include performing error-correction processing for the restored outer packets.

Also, although not illustrated in FIG. 8, the broadcast signal transmission method according to an embodiment of the present invention may further include transmitting the generated broadcast signal through a broadcast channel.

Figure 9:
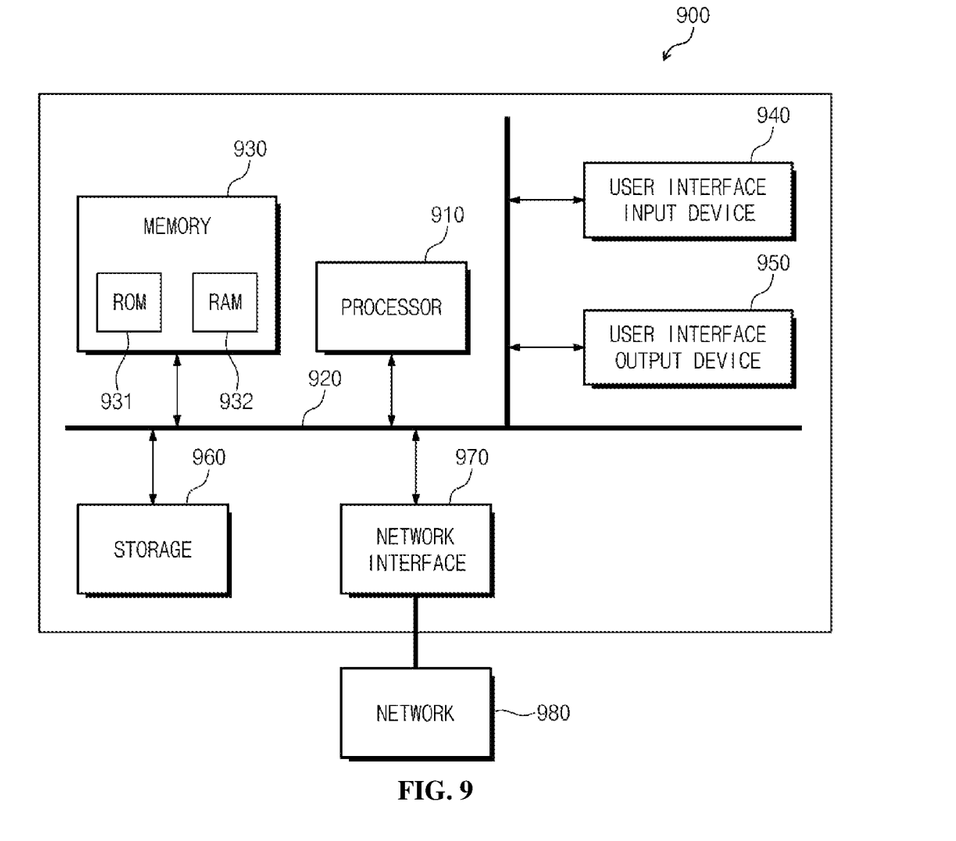
FIG. 9 is a view that shows a computer system according to an embodiment of the present invention.

FIG. 9 is a view that shows a computer system according to an embodiment of the present invention.

Referring to FIG. 9, the broadcast gateway apparatus and/or the broadcast signal transmission apparatus according to an embodiment of the present invention may be implemented in a computer system 900 including a computer-readable recording medium. As illustrated in FIG. 9, the computer system 900 may include one or more processors 910, memory 930, a user-interface input device 940, a user-interface output device 950, and storage 960, which communicate with each other via a bus 920. Also, the computer system 900 may further include a network interface 970 connected to a network 980. The processor 910 may be a central processing unit or a semiconductor device for executing processing instructions stored in the memory 930 or the storage 960. The memory 930 and the storage 960 may be any of various types of volatile or nonvolatile storage media. For example, the memory may include ROM 931 or RAM 932.

According to the present invention, broadcast data may be efficiently transmitted from a broadcast gateway apparatus to a transmitter, and reliability may be provided regardless of the state or type of network that is used.

Also, the present invention may provide a broadcast-gateway-signaling method, which may ensure reliability even when a public network is used between a broadcast gateway apparatus and a transmitter.

Also, the present invention may optimize a broadcast-gateway-signaling field, which is used in order to ensure reliability when a public network is used between a broadcast gateway apparatus and a transmitter.

As described above, the broadcast-gateway-signaling method and apparatus according to the present invention are not limitedly applied to the configurations and operations of the above-described embodiments, but all or some of the embodiments may be selectively combined and configured, so that the embodiments may be modified in various ways.

What is claimed is:

1. A broadcast gateway apparatus, comprising:
an inner packet generator for generating an inner packet corresponding to an inner layer of a tunneling system;
an outer packet generator for generating an outer packet corresponding to an outer layer of the tunneling system using the inner packet;
an outer packet header generator for generating a header of the outer packet; and
a Studio-to-Transmitter Link (STL) transmission unit for transmitting the outer packet to a transmitter via an STL,
wherein the header includes a redundancy field,
wherein the redundancy field is a two-bit field, is set to '0' in order to indicate that there are no redundant copies of the outer packet, and is set to an integer that is greater than '0' and less than '4' in order to indicate that there are redundant copies of the outer packet.

2. The broadcast gateway apparatus of claim 1, wherein the inner packet is encapsulated through the outer packet.

3. The broadcast gateway apparatus of claim 1, wherein the tunneling system is configured such that a group of parallel and independent packet streams corresponding to the inner packet are carried within a single packet stream corresponding to the outer packet.

4. The broadcast gateway apparatus of claim 1, wherein:
the outer packet is transmitted through an RTP/UDP/IP unicast protocol stack, and
the inner packet is transmitted through an RTP/UDP/IP multicast protocol stack.

5. The broadcast gateway apparatus of claim 1, wherein the header includes the redundancy field that indicates the number of redundancies of the outer packet.

6. The broadcast gateway apparatus of claim 5, wherein the header includes a sequence number field that is increased by one for each packet of an RTP stream.

7. The broadcast gateway apparatus of claim 5, wherein, when the redundancy field is set to an integer that is greater than '0' and less than '4', the STL transmission unit transmits redundancies of the outer packet having a same sequence number field, in accordance with the redundancy field.

8. The broadcast gateway apparatus of claim 1, wherein, when the redundancy field is set to an integer that is greater than '0' and less than '4', the redundancy field indicates the number of redundant streams.

9. An apparatus for transmitting a broadcast signal, comprising:
a packet reception unit for receiving signals corresponding to outer packets, which are transmitted via an STL;
an outer-packet-processing unit for processing a protocol, thereby restoring the outer packets;
a redundancy-processing unit for performing redundancy processing for multiple outer packets, corresponding to redundancies, using a redundancy field included in a header of each of the outer packets, thereby generating an outer packet, redundancy of which is processed; and
a physical-layer-processing unit for performing physical-layer processing using the outer packet, the redundancy of which is processed, thereby generating a broadcast signal to be transmitted,
wherein the redundancy field is a two-bit field, is set to '0' in order to indicate that there are no redundant copies of the outer packet, and is set to an integer that is greater than '0' and less than '4' in order to indicate that there are redundant copies of the outer packet.

10. The apparatus of claim 9, wherein the header includes a sequence number field that is increased by one for each packet of an outer packet RTP stream, and the multiple outer packets corresponding to the redundancies are identified using the sequence number field.

11. The apparatus of claim 10, further comprising:
an error-correction-processing unit for performing error-correction processing for the restored outer packets.

12. The apparatus of claim 10, wherein:
each of the outer packets includes one or more inner packets in a payload thereof and corresponds to an outer layer of a tunneling system, and
the inner packet corresponds to an inner layer of the tunneling system.

13. The apparatus of claim 10, wherein:
the outer packets are transmitted through an RTP/UDP/IP unicast protocol stack, and
an inner packet included in the outer packet is transmitted through an RTP/UDP/IP multicast protocol stack.

14. The apparatus of claim 10, wherein the redundancy field indicates the number of redundancies of the outer packet.

15. The apparatus of claim 9, wherein, when the redundancy field is set to an integer that is greater than '0' and less than '4', the redundancy field indicates the number of redundant streams.

16. A broadcast-gateway-signaling method, comprising:
generating an inner packet corresponding to an inner layer of a tunneling system;
generating an outer packet corresponding to an outer layer of the tunneling system using the inner packet; and
transmitting the outer packet to a transmitter via a Studio-to-Transmitter Link (STL),
wherein the outer packet includes a header, which includes a redundancy field that indicates the number of redundancies,
wherein the redundancy field is a two-bit field, is set to '0' in order to indicate that there are no redundant copies of the outer packet, and is set to an integer that is greater than '0' and less than '4' in order to indicate that there are redundant copies of the outer packet.

17. The broadcast-gateway-signaling method of claim 16, wherein, when the redundancy field is set to an integer that is greater than '0' and less than '4', the redundancy field indicates the number of redundant streams.

* * * * *